United States Patent [19]

Mori

[11] Patent Number: 4,905,471
[45] Date of Patent: Mar. 6, 1990

[54] BLADE FIXING MECHANISM FOR TORQUE CONVERTER

[75] Inventor: Mitsuyoshi Mori, Hirakata, Japan

[73] Assignee: Kabushiki Kaisha Daikin Seisakusho, Neyagawa, Japan

[21] Appl. No.: 208,602

[22] Filed: Jun. 20, 1988

[30] Foreign Application Priority Data

Jun. 30, 1987 [JP] Japan .......................... 62-101510[U]

[51] Int. Cl.$^4$ ............................................. F16D 33/00
[52] U.S. Cl. ......................................... 60/366; 60/364
[58] Field of Search ................. 60/330, 364, 365, 366, 60/367

[56] References Cited

U.S. PATENT DOCUMENTS 2,632,396  3/1953  Koskinen ........................... 60/367 X
2,632,397  3/1953  Jandasek ............................ 60/365 X
2,988,006  6/1961  Becker ............................... 60/366 X Primary Examiner—Edward K. Look
Attorney, Agent, or Firm—Armstrong, Nikaido, Marmelstein, Kubovcik & Murray

[57] ABSTRACT

A great number of blades are disposed in a shell inside with appropriate distances left between them in a circumferential direction of a shell. Each blade has an approximately fan-shaped blade body and a flange protruding from an inner peripheral edge in a prescribed direction along a circumference of a shell. An outer peripheral edge of each blade is secured to the shell. The flange of each blade is made contact with a neighboring blade over the entire circumferential length of the blade, and these contacting portions are secured each other in a watertight manner. A core ring is not installed.

5 Claims, 2 Drawing Sheets

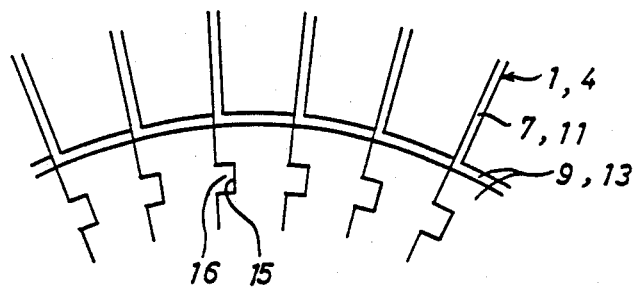
FIG. 3
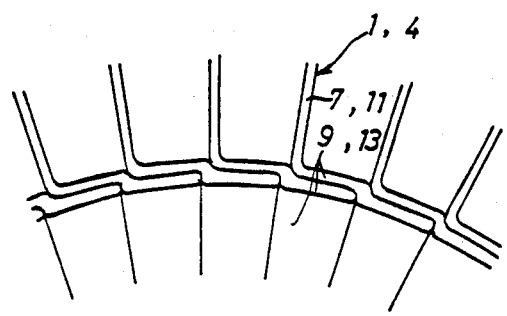
FIG. 4
FIG. 5
PRIOR ART
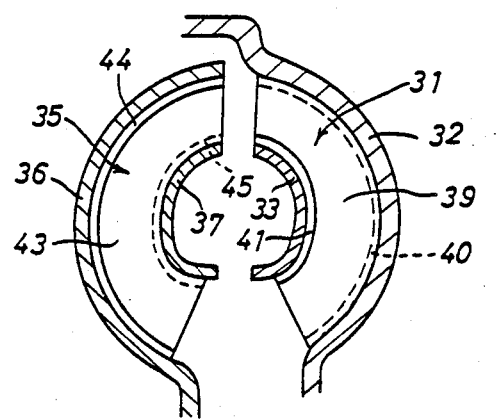

BLADE FIXING MECHANISM FOR TORQUE CONVERTER

BACKGROUND OF THE INVENTION

1. Industrial useful field

This invention relates to a fixing mechanism for fixing a blade of a pump impeller or a turbine runner for a torque converter.

2. Prior art

In a conventional torque converter, as illustrated by FIG. 5, an outer peripheral side of a blade 31 of a pump impeller has been fixed to a shell 32 of the pump impeller, an inner peripheral side thereof has been fixed to a core ring 33 of the pump impeller. Further, an outer peripheral side of a blade 35 of a turbine runner has been fixed to a shell 36 of the turbine runner, and an inner peripheral side thereof has been fixed to a core ring 37 of the turbine runner. Namely, the blade 31 of the pump impeller has been composed of an approximately fan-shaped blade body 39, a flange 40 integrally protruding from an outer peripheral edge of the blade body 39 in a circumferential direction of the shell 32 toward the other side of a plane of FIG. 5, and a flange 41 integrally protruding from an inner peripheral edge of the blade body 39 in the circumferential direction of the shell 32 toward this side of the plane of FIG. 5. The flange 40 has been brazed to the shell 32 and the flange 41 has been brazed to the core ring 33. Further, the blade 35 of the turbine runner has been composed of an approximately fan-shaped blade body 43, a flange 44 integrally protruding from an outer peripheral edge of the blade body 43 in a circumferential direction of the shell 36 toward this side of the plane of FIG. 5, and a flange 45 integrally protruding from an inner peripheral edge of the blade body 43 in the circumferential direction of the shell 36 toward the other side of the plane of FIG. 5. The flange 44 has been brazed to the shell 36 and the flange 45 has been brazed to the core ring 37.

In another conventional embodiment, projections have been formed on flanges at outer and inner peripheral edges of the blade respectively, these projections have been made fit in slits formed on the shell and the core ring, and these projections have been bent to fix the blade.

In such a conventional embodiment, however, the core rings 33 and 37 have been required in any case so that the torque converter has become weighty to increase its manufacturing cost.

SUMMARY OF THE INVENTION

1. Object of the invention

An object of the invention is to provide a blade fixing mechanism which is able to lessen a weight of a converter and reduce its manufacturing cost.

2. Structure of the invention

In order to accomplish the above-mentioned object, the blade fixing mechanism for torque converter according to the present invention includes the following structure. In a torque converter disposing plural blades each having an approximately fan-shaped blade body and a flange protruding from an inner peripheral edge in a prescribed direction along a circumference of a shell, in a shell inside with appropriate distances left therebetween in a circumferential direction of the shell, and fixing an outer peripheral edge of said each blade to said shell; said flange of each blade is made contact with a neighboring blade over the entire circumferential length of the blade, and these contacting portions are secured each other in a water-tight manner.

BRIEF DESCRIPTION OF THE DRAWINGS

FIG. 3 is an explanatory view showing an essential part of a torque converter employing a blade fixing mechanism of another embodiment.

FIG. 4 is an explanatory view showing an essential part of a torque converter employing a blade fixing mechanism of a further another embodiment.

FIG. 5 is a sectional view of an essential part of a torque converter employing a conventional blade fixing mechanism.

DETAILED DESCRIPTION OF THE INVENTION Embodiment 1

Figure 1:
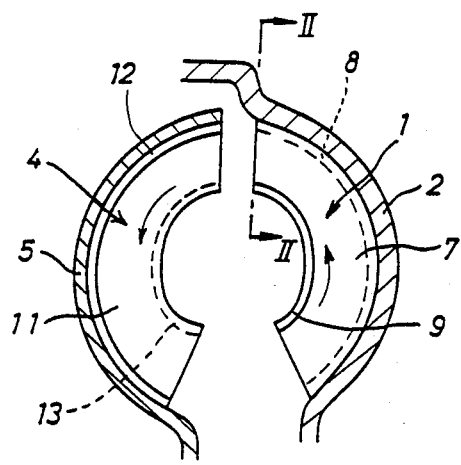
FIG. 1 is a sectional view of an essential part of a torque converter employing a blade fixing mechanism of an embodiment of the present invention.
Figure 2:
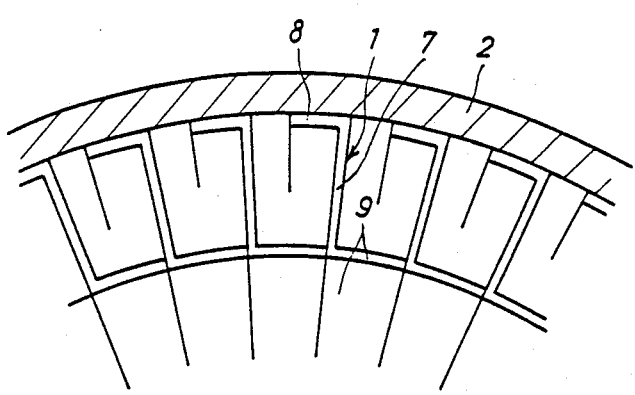
FIG. 2 is a sectional view taken on a line II—II of FIG. 1.

As seen from FIG. 1 and FIG. 2, a blade 1 of a first rotating element or pump impeller is disposed in an inside of a shell 2 of the pump impeller at plural places with appropriate distances left therebetween in a circumferential direction of the shell 2, and outer peripheral sides of the blades 1 are fixed to the shell 2. A blade 4 of a second rotating element or turbine runner is disposed in an inside of a shell 5 of the turbine runner at plural places with appropriate distances left therebetween in a circumferential direction of the shell 5, and outer peripheral sides of the blades 4 are fixed to the shell 5. As is generally known, a working oil is filled in the inside of the shell 2 of said pump impeller, the shell 2 is driven rotatively together with said blade 1 around an axis shown by an alternate long and short dash line in FIG. 1, and the shell 5 of the turbine runner is carried rotatably together with the blade 4 around the axis shown by the alternate long and short dash line in FIG. 1.

The blade 1 of the pump impeller is composed of an approximately fan-shaped blade body 7, a flange 8 integrally protruding from an outer peripheral edge of the blade body 7 in a circumferential direction of the shell 2 toward the other side of a plane of FIG. 1, and a flange 9 integrally protruding from an inner peripheral edge of the blade body 7 in the circumferential direction of the shell 2 toward this side of the plane of FIG. 1. The flange 8 is secured to the shell 2 by an appropriate means such as a brazing etc.

The blade 4 of the turbine runner is composed of an approximately fan-shaped blade body 11, a flange 12 integrally protruding from an outer peripheral edge of the blade body 11 in a circumferential direction of the shell 5 toward this side of the plane of FIG. 1, and a flange 13 integrally protruding from an inner peripheral edge of the blade body 11 in the circumferential direction of the shell 5 toward the other side of the plane of FIG. 1. The flange 12 is secured to the shell 5 by an appropriate means such as the brazing etc.

As illustrated in details by FIG. 2, the flange 9 of each blade 1 of the pump impeller contacts at its protruding end with a root end of the flange 9 of the neighboring blade 1 over the entire circumferential length of the blade 1, and this contacting portion is secured by brazing in a watertight manner. Although not shown in the figure, the blade 4 of the turbine runner is installed in the same way. Namely, a flange 13 of each blade 4 contacts at its protruding end with a root end of the flange 13 of the neighboring blade 4 over the entire circumferential length of the blade 4, and this contacting portion is secured by brazing in the watertight manner.

Function of the invention

Since each blade 1 of the pump impeller is secured in the watertight manner to the flange 9 of the blade 1 to which the flange 9 is adjacent, the flange 9 functions as a conventional core ring 33. Namely, inner peripheral sides of the blade 1 are secured to each other through the flanges 9. Further, the shell 2 together with the blade bodies 7 neighboring each other cause the flanges 9 to be opened at both ends and to form a plurality of fan-shaped spaces along the circumferential direction of the blade 1 with appropriate distances left therebetween in the circumferential direction of the shell 2, so that these spaces compose flow passages of the working oil. Moreover, since each blade 4 of the pump impeller is secured in the watertight manner to the flange 13 of the blade 4 to which the flange 13 is adjacent, the flange 13 functions as a conventional core ring 37. Namely, inner peripheral sides of the blade 4 are secured to each other through the flanges 13. Furthermore, the shell 5 together with the blade bodies 11 neighboring each other cause the flanges 13 to be opened at both ends and to form a plurality of fan-shaped spaces along the circumferential direction of the shell 4 with appropriate distances left therebetween in the circumferential direction of the shell 5, so that these spaces compose flow passages of the working oil. Incidentally, flow directions of working oil in each flow passage are shown by arrows in FIG. 1.

As mentioned above, since the flanges 9 and 13 of the blades 1 and 4 function as the core rings 33 and 37, the core rings 33 and 37 can be eliminated so that the weight of torque converter can be lessened and its manufacturing cost can be reduced.

Embodiment 2

As illustrated in FIG. 3, a recession 15 is formed on one side face of each flange 9 or flange 13 and a projection 16 is formed on the other side face, so that the projection 16 is made fit in the recession 15. Then, the neighboring blades 1 or blades 4 can be joined each other more tightly.

Embodiment 3

As illustrated in FIG. 4, the flanges 9 or flanges 13 are so constructed that they can be brazed by placing one upon another. Then, a strength of structure can be improved.

Incidentally, in the foregoing embodiment, the flanges 9 or flanges 13 are secured each other by the brazing work. However, the securing means is not limited to the brazing but any other means will do provided that it can secure the flanges in the watertight manner.

Effect of the invention

As described above, according to the present invention, the flange of each blade is made contact with the neighboring blade over the entire circumferential length of blade and these contacting portions are secured each other in the watertight manner. Accordingly, the flanges become able to serve as the core ring so that the conventional core ring can be disused. Thereby, the torque converter can be lessened in its weight and reduced in its manufacturing cost.

What is claimed is:

1. A torque converter of sheet metal construction comprising first and second rotating elements with at least one of said rotating elements including a plurality of blades arranged adjacent each other, each of said blades comprising a fan-shaped radially extending blade body having a flange at each radially spaced end thereof, the flange at the radially outer end of each blade body being secured to an outer shell and the flange at the radially inner end of each blade body being secured to the flanges at the radially inner end of each adjacent blade body with each of said flanges at the radially inner end of each blade body having a recess formed in one side thereof and a projection formed on another side with each recess positioned to receive a projection on an adjacent blade body flange, each of said recesses and projections extending over only a portion of the length of each flange whereby said flanges at the radially inner ends of said plurality of blade bodies are secured to each other in a watertight manner over the entire inner circumference of said one rotating element.

2. A torque converter as set forth in claim 1, wherein said rotating element is a pump impeller.

3. A torque converter as set forth in claim 1, wherein said rotating element is a turbine runner.

4. A torque converter as set forth in claim 1, wherein said first and second rotating elements are a pump impeller and a turbine runner and both of said rotating elements include a plurality of blades as defined by claim 6.

5. A torque converter as set forth in claim 4, in which the flanges of the blades for the pump impeller and the flanges of the blades for the turbine runner protrude in directions opposite to each other.

* * * * *